Figure 1:
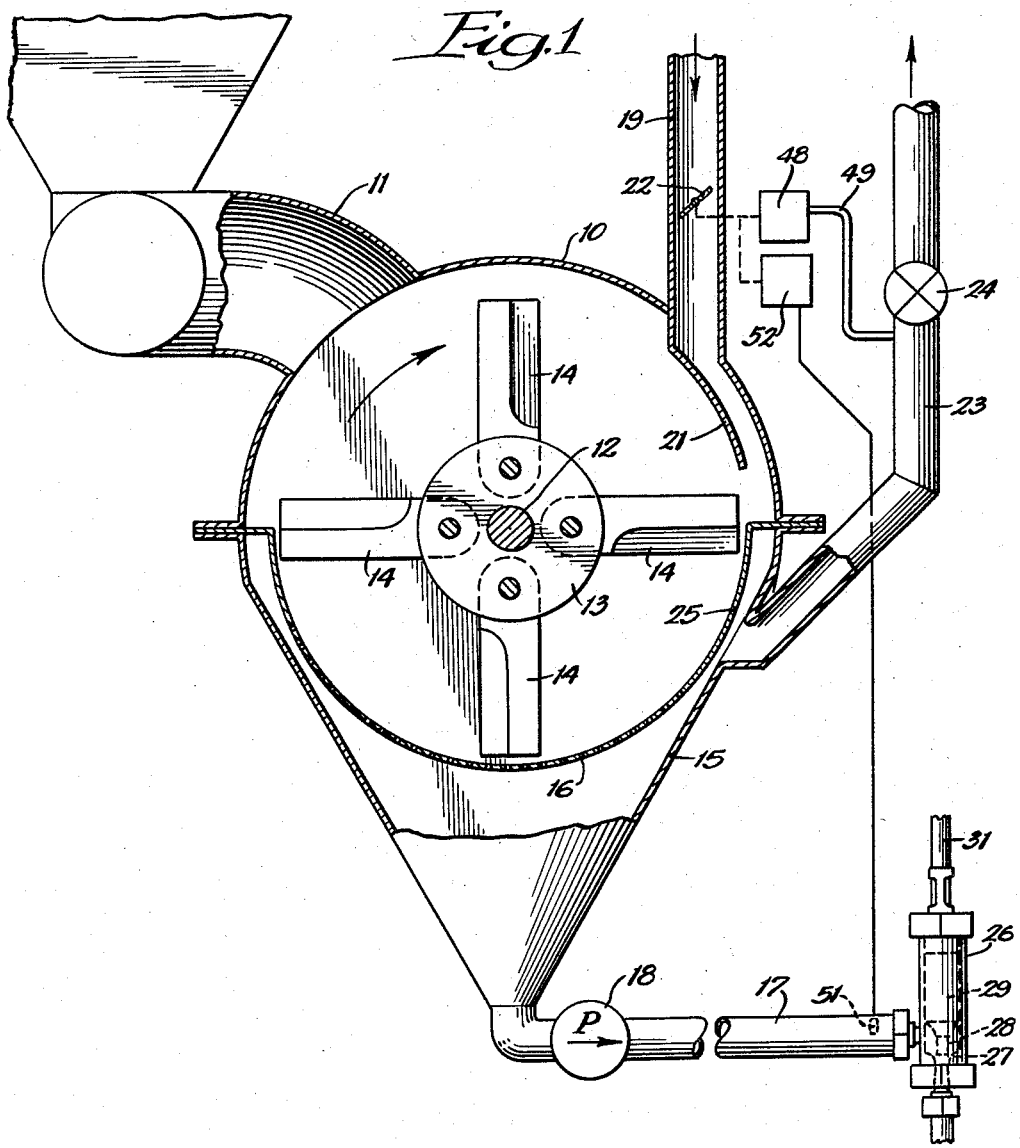

Feb. 17, 1959   LE ROY R. HAWK ET AL   2,873,663
APPARATUS FOR PROCESSING FOOD AND THE LIKE
Filed April 30, 1956   2 Sheets-Sheet 1

INVENTORS:
Leroy R. Hawk
Elmer G. Magnus,
and Dewey A. Manion,
BY Bair, Freeman & Molinare
ATTORNEYS.

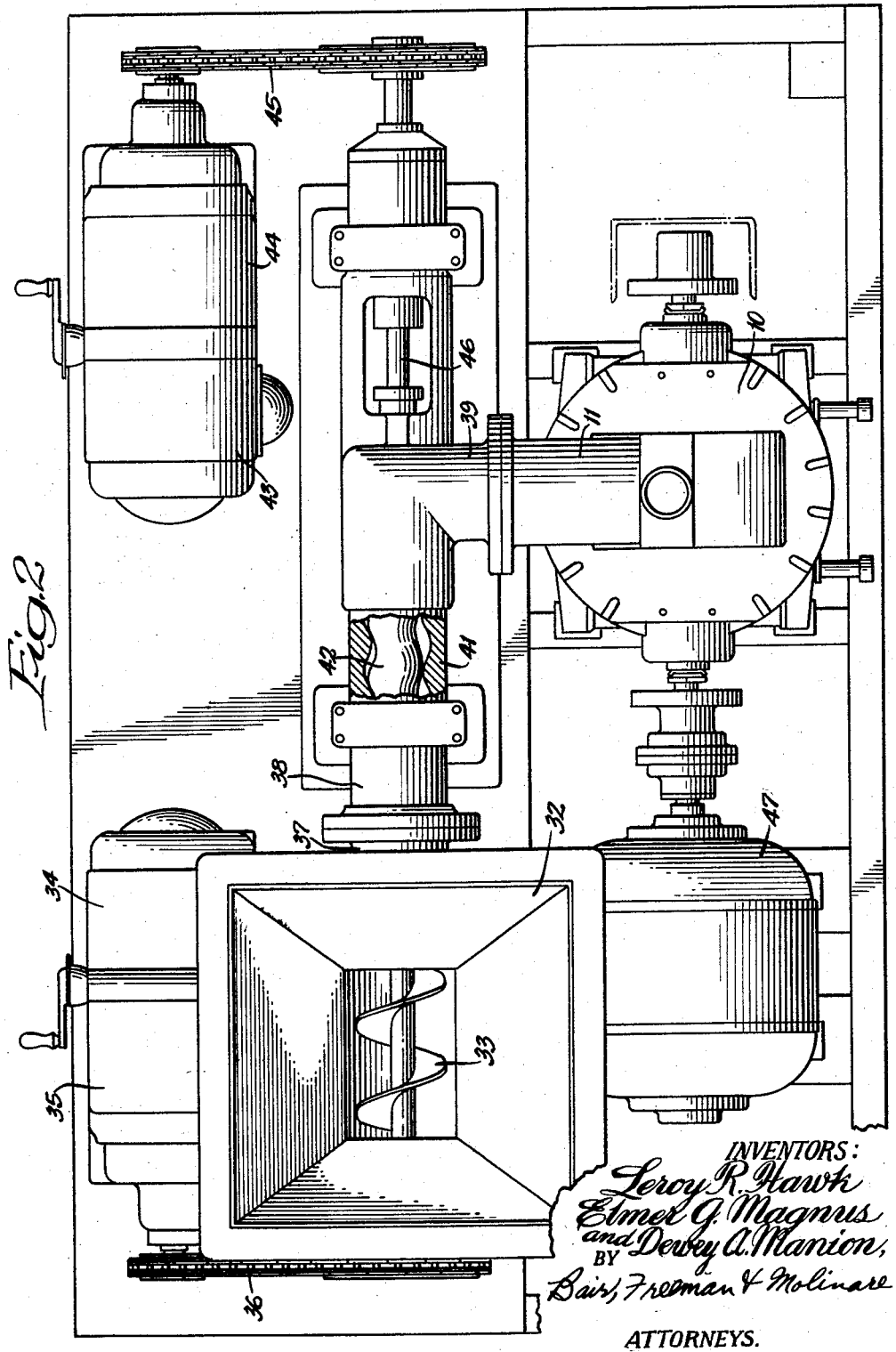

United States Patent Office 2,873,663
Patented Feb. 17, 1959

2,873,663

APPARATUS FOR PROCESSING FOOD AND THE LIKE

Le Roy R. Hawk, Hayward, Calif., and Elmer G. Magnus and Dewey A. Manion, Chicago, Ill., assignors to W. J. Fitzpatrick Company, Chicago, Ill., a corporation of Illinois Application April 30, 1956, Serial No. 581,682

4 Claims. (Cl. 99—234)

This invention relates to apparatus for processing food products and the like, and more particularly to apparatus for simultaneously comminuting or reducing and heating to cook or partially cook the products.

In many industrial processes, in oil extraction and in the preparation of many types of food such as purees, soups and the like, it is necessary to comminute or reduce the products and also to subject them to heating for accomplishing physical or chemical changes therein such as cooking. While the present apparatus is highly advantageous for use in treating many different types of materials, it is particularly advantageous in the preparation of foods and will be specifically described in this connection.

In making vegetable or meat purees, soups and the like, it is necessary to reduce the food products to relatively fine particles or pulp, and to cook the foods, as for example, in the preparation of canned baby foods and similar products. With conventional processes as heretofore practiced, difficulties are encountered in accurately controlling the cooking and in eliminating losses due to discoloration and enzyme action in the products after reduction or comminution and prior to cooking. Further, the apparatus required for conventional processing is large and expensive, consisting of a number of units through which the products are passed in succession.

It is one of the objects of the present invention to provide apparatus for processing food products and the like, which is relatively small and compact, which effects a very accurate control of the several steps in the process, and in which losses due to discoloration or enzyme action are eliminated.

Another object is to provide apparatus in which the comminution or reduction, and at least the initial cooking or heating, are accomplished simultaneously by effecting the comminution in an atmosphere of steam under pressure. By this means discoloration is eliminated and enzyme action is stopped immediately so that losses due to these causes are eliminated.

According to one feature of the invention the products are comminuted in a chamber which is vented through a restricted vent to maintain a predetermined pressure in the chamber, and which is continuously supplied with steam under pressure. The vent is preferably positioned below a discharge screen in the chamber and is covered by an imperforate portion of the screen to prevent blow-out of products therethrough. Venting deaerates the products while they are being heated in addition to maintaining a flow of steam.

A further object is to provide apparatus in which control of the heating or cooking is effected accurately by controlling the supply of steam to the comminuting chamber in response to the pressure in the chamber or in the vent. If desired, the control may be modified in response to the temperature of the finished product to insure an extremely high degree of accuracy.

A still further object is to provide apparatus in which the product is held under pressure a predetermined time after being comminuted to complete the heating or cooking operation and is then released suddenly to a lower pressure.

According to another feature of the invention the product is held in an elongated discharge conduit, and a discharge pump is employed between the comminuting chamber and the conduit to maintain pressure in the conduit.

The above and other objects and features of the invention will be more readily apparent from the following description when read in connection with the accompanying drawings, in which:

Figure 1 is a more or less diagrammatic view with parts in section of an apparatus embodying the invention; and Figure 2 is a top plan view of the apparatus with parts in section.

The apparatus as best seen in Figure 1 comprises a comminutor chamber 10 of partially cylindrical shape formed in its upper part with an inlet conduit 11 through which the products to be treated are supplied thereto. A rotatable shaft 12 extends axially through the chamber 10 and carries a hub structure 13 within the chamber on which a plurality of comminuting blades 14 are pivotally mounted. The blades 14 as shown may be sharpened on their leading edges, although for many types of products flat or dull edged blades may be preferable.

The lower part of the comminuting chamber is closed by a discharge chamber 15 which may be detachably secured to the chamber 10 and which tapers to a relatively reduced discharge opening at its bottom. An arcuate screen 16 is supported at the juncture of chambers 10 and 15, and is arcuately curved as indicated to lie relatively close to the tips of the blades 14. Material comminuted in the chamber will be discharged through the openings in the screen into the discharge chamber 15 and may be carried away from the discharge chamber through an elongated discharge pipe 17. Preferably, a pump 18 is provided between the discharge chamber and the conduit to maintain the material in the conduit under pressure.

The chamber is supplied with steam under pressure through a steam supply conduit 19 which opens into the upper part of the chamber and whose discharge opening is protected by a curved baffle 21 spaced from the inner wall of the chamber. The baffle as shown extends in the direction of rotation of the blades so that it will prevent material in the chamber from being forced out into the steam supply conduit, and so that the steam from the conduit can be discharged freely into the chamber. The supply of steam is controlled by a valve indicated at 22 to maintain a proper steam atmosphere in the chamber as explained more fully hereinafter.

Air or other gases entrained in the products, as well as some steam, are vented from the chamber through a vent conduit 23 having a valve 24 therein by which the degree of restriction of the vent conduit can be adjusted. The vent conduit is connected to the discharge chamber 15 below the screen 16, and the screen is formed with an imperforate portion 25 overlying the opening to the vent conduit to prevent products from being thrown out the vent conduit. Throw-out of products is also eliminated by providing the vent conduit connection at a point at which the tips of the blades 14 are traveling downward.

The product in the discharge conduit 17 is maintained under pressure by a valve indicated generally at 26, and which may be of the type more particularly described and claimed in the co-pending application of Robert F. Krupp, Serial No. 513,360, filed June 6, 1955. As indicated generally in Figure 1, said valve comprises a flared seat 27 and a plunger having a tapered end 28 to extend into the seat. The plunger includes a major piston portion 29 subjected to controlling pressure through an inlet conduit 31 at its upper end to hold the valve against its seat with a predetermined pressure. When the pressure of the comminuted products acting on the lower end of the plunger 29 exceeds the controlling pressure acting on the upper end of the plunger, the plunger will move up and open the valve, allowing the products to be discharged suddenly through the seat 27 to suddenly relieve the pressure thereon.

The material to be processed is forced into the comminuting chamber under positive pressure and in a manner to prevent back-flow of steam or gas through the inlet opening. As best seen in Figure 2, this is accomplished by providing a hopper 32 into which the products to be treated can be fed in any desired manner in a raw or semi-prepared state, and in the form of relatively large particles. The open bottom of the hopper overlies a conventional feed screw 33 which is driven by a motor 34, preferably through an adjustable speed reducer 35 and a sprocket chain 36 to force the products through an outlet conduit 37. The outlet conduit is connected to the inlet opening of a positive displacement pump indicated generally at 38, whose outlet 39 is connected to the inlet conduit 11 of the comminutor chamber.

According to one feature of the invention, the pump 38 is of a type commercially known as a Moyno pump, as particularly disclosed in United States Patents Nos. 2,085,115, 2,028,407, and 2,512,764. As indicated in partial section in Figure 2, the pump comprises a stationary tubular body 41 formed on its interior with a double helical passage and a helical rotor 42 of circular cross section, which is mounted in the passage for rotation and for lateral floating movements. The rotor is driven by a motor 43 through a speed reducer 44, sprocket chain 45 and drive shaft 46, which is universally coupled to the rotor 42 to permit floating of the rotor. It has been found that a pump of this type will feed the products under positive pressure into the comminutor chamber without allowing steam or gases to flow back through the pump, and without crushing the products, whereas feed mechanisms of various other types such as conventional screw feeds were found to be unsatisfactory for purposes of the present apparatus.

As also indicated in Figure 2, the comminutor rotor is independently driven through a motor 47. By utilizing separate motors to drive the different parts, and particularly by utilizing the adjustable speed reducers 35 and 44, the feed ratios can be changed to change the retention time of material in the apparatus.

In use of the apparatus for treating various types of products, the products are placed in the hopper 32 and are forced by the feed screw and the pump 38 into the comminutor chamber. The comminutor chamber is maintained full of steam under pressure, and the rotor is turned at a relatively high speed to cause the blades 14 to extend outward radially as shown in Figure 1. As the products enter the inlet conduit 11, they tend to fall through the steam atmosphere in the chamber and are struck by the rapidly moving blades 14 to be comminuted or reduced to the desired particle size as determined by the size of the openings in the screen 16.

The comminuted products pass the screen 16 and are pumped by the pump 18 through the discharge conduit 17 where they are maintained under a pressure and at an elevated temperature for a period of time predetermined by the feed rate. After the products are discharged past the valve 26, the pressure is suddenly relieved thereon and the products may be taken to other apparatus for further treatment or handling. In the case of most food products, the material discharged past the valve 26 may be taken directly to a canning machine to be canned. Air entrained in the products and excess steam are vented through the vent conduit 23 so that fresh steam under pressure is continuously supplied to the comminutor chamber to maintain the desired atmosphere therein. Thus the products are always comminuted in an atmosphere of steam under pressure so that as they are comminuted, they are immediately cooked or treated by heat to prevent any discoloration or enzyme action.

In order to maintain the desired pressure and temperature in the comminutor chamber, the supply of steam to the chamber is regulated by adjusting the valve 22. As diagrammatically illustrated in Figure 1, a control instrument 48 is provided for this purpose connected by a pipe 49 to a point in the vent conduit 23 anterior to the restriction 24. In this way the valve 22 is controlled in response to the pressure in the vent conduit, which is representative of the pressure in the comminutor chamber and functions to maintain a predetermined pressure in the comminutor chamber. By accurately maintaining the pressure, the temperature in the chamber is accurately maintained at all times, so that the desired treatment will be effected.

Preferably, control of the steam supply is corrected in response to temperature of the product, so that the product temperature will be accurately maintained. For this purpose a temperature bulb 51 is placed in the discharge conduit 17 and is connected to a temperature responsive instrument 52 which is in turn connected to the valve 22. The valve 22 is thus controlled in response to both pressure in the chamber and temperature of the product, but the primary control will be responsive to the chamber pressure since considerable lag will occur in changes in the product temperature.

As examples of products which may be treated in the present apparatus, various vegetables have been processed for the production of purees suitable for baby foods, soups and the like. In treating peas, the whole washed peas were fed into the comminutor through the screw feed and pump and the pressure in the comminutor chamber was adjusted to produce a temperature of about 238° F. A screen at 16 having openings of .045 inch was employed. Various holding times and various temperatures were used with peas of different degrees of ripeness, and it was found that by adjusting the temperature and holding time, peas of substantially any degree of maturity could be effectively processed to produce a satisfactory product.

Various other vegetables, including carrots, beets, tomatoes, and sweet potatoes, were processed in a similar manner with differences only in the temperatures, screen sizes, and holding times. With carrots, for example, satisfactory results were obtained using a screen size of .031 inch, a temperature of 228° F. and a holding time of about 31 seconds. With beets, a screen size of .031 inch, a temperature of 240° F. and a holding time of about 20 seconds produced satisfactory results. With tomatoes, a one-half inch screen was employed with temperatures varying from 220° F. to 280° F., and a holding time of about 20 seconds. After treatment in the apparatus the tomatoes were run through a finisher to remove seeds and pieces of peel, and very satisfactory tomato juice was produced. With sweet potatoes, it was found that various temperatures and holding times were required for different types of potatoes, and that satisfactory results could be obtained with almost any type of potatoes by adjusting the temperatures and holding times with very accurate control of the product.

Various fruits were also processed, including apricots, peaches, and apples to produce extremely satisfactory purees or sauces. With apricots and peaches, the fruit was first skinned and pitted, and various screen sizes and temperatures were utilized with an average holding time of about 20 seconds. Satisfactory results were obtained with screens as small as .031 inch and as large as .063 inch, and with temperatures varying from 210° F. to 275° F. Peaches were treated in the same manner as apricots, and in both cases extremely satisfactory products resulted. With apples, the most satisfactory results were obtained by utilizing a one-half inch screen with a temperature of 230° F. and a holding time of 1½ minutes, and following treatment in the apparatus by running the product through a finisher with a .020 inch screen. It is appreciated that these conditions may be varied to some extent, depending upon the quality and condition of the fruit.

Meats were also processed in the apparatus, including beef for the production of soups and bacon for infant foods. In processing meats the general procedure is to chop or cut the meat into chunks of a size which can be fed through the pump, and in some cases precooking was employed to partially cook the meat. Screen sizes may be varied, depending upon the character of the product desired, but in general sizes from .047 inch to .063 inch were found to be satisfactory, with temperatures on the order of 250° F. to 290° F.

After being treated in the present apparatus, the meat products were run through one or more finishers to remove hard and undesirable particles in the products. It was found that in the case of meats the saving through use of the present apparatus was quite marked with the waste being reduced some 30 times as compared to the waste resulting from conventional processing.

In all cases the apparatus employed according to the present invention is far simpler and more compact than conventional apparatus of comparable capacity, and in the cases of many products far more satisfactory end products were obtained than with conventional apparatus.

While one particular form of apparatus has been shown and described, it will be understood that variations in many respects might be made therein, and it is therefore, not intended to limit the scope of the invention to the precise apparatus shown nor otherwise than by the terms of the appended claims.

What is claimed is:

1. Apparatus for processing fruits, vegetables and meats containing a substantial proportion of solids comprising a comminuting chamber, a rotor in the chamber having a series of radially extending sharpened blades thereon to cut solid particles in the material in the chamber, an inlet conduit connected to the upper part of the chamber, pump means to force material to be processed under positive pressure through the inlet conduit into the chamber, a connection to the upper part of the chamber to supply steam under pressure thereto, a curved screen in the lower part of the chamber through which comminuted material must pass, an elongated closed discharge conduit connected to the chamber below the screen to receive comminuted material passing through the screen, a steam vent connection to the chamber beneath the screen, an imperforate sheet overlying the vent connection to block direct discharge of solid material therethrough, a control valve in the steam supply connection, control means responsive to pressure in the chamber to control the valve to maintain a predetermined pressure in the chamber whereby the material will be comminuted in an atmosphere of steam under pressure, and a pressure responsive discharge valve in the discharge conduit to maintain a predetermined pressure on the material in the discharge conduit and opening suddenly in response to a predetermined pressure to release the pressure on the material suddenly.

2. Apparatus for processing fruits, vegetables and meats containing a substantial proportion of solids comprising a comminuting chamber, a rotor in the chamber having a series of radially extending sharpened blades thereon to cut solid particles in the material in the chamber, an inlet conduit connected to the upper part of the chamber, pump means to force material to be processed under positive pressure through the inlet conduit into the chamber, a connection to the upper part of the chamber to supply steam under pressure thereto, a curved screen in the lower part of the chamber through which comminuted material must pass, a discharge chamber connected to the comminuting chamber and enclosing the space below the screen to receive comminuted material therefrom, a steam vent connection to the discharge chamber, an imperforate sheet overlying the vent connection to block direct discharge of solid material therethrough, a control valve in the steam supply connection, control means responsive to pressure in the chamber to control the valve to maintain a predetermined pressure in the chamber whereby the material is comminuted in an atmosphere of steam under pressure, a pump having its inlet connected to the discharge chamber, an elongated pressure responsive discharge conduit connected to the pump outlet, and a discharge valve in the conduit to maintain a predetermined pressure on the material therein and opening suddenly in response to a predetermined pressure to release the pressure on the material suddenly.

3. Apparatus for processing fruits, vegetables and meats containing a substantial proportion of solids comprising a comminuting chamber, a rotor in the chamber having a series of radially extending sharpened blades thereon to cut solid particles in the material in the chamber, a curved screen in the lower part of the chamber through which comminuted material must pass, an inlet conduit connected to the upper part of the chamber, pump means to force material to be processed into the inlet conduit under positive pressure, a steam supply conduit connected to the upper part of the chamber, a baffle in the chamber overlying the end of the steam supply conduit and opening in the direction of travel of the rotor, a valve in the steam supply conduit, a vent conduit connected to the chamber beneath the screen at a point at which the blades are moving downwardly, the screen including an imperforate portion overlying the vent conduit, control means responsive to pressure in the vent to control the valve, an elongated outlet conduit connected to the lower part of the chamber to receive material passing through the screen, and a pressure responsive discharge valve in the outlet conduit to maintain a predetermined pressure on the material therein and opening suddenly in response to a predetermined pressure to release the pressure on the material suddenly.

4. The apparatus of claim 3 including a pump having its inlet connected to the lower part of the chamber and its outlet connected to the outlet conduit.

References Cited in the file of this patent

UNITED STATES PATENTS

| | | |
|---|---|---|
| 1,168,823 | Nielsen | Jan. 18, 1916 |
| 2,086,338 | Sodergreen | July 6, 1937 |
| 2,319,629 | Poese | May 18, 1943 |
| 2,348,916 | Magnus | May 16, 1944 |
| 2,359,714 | McKay | Oct. 3, 1944 |
| 2,498,209 | Iredale | Feb. 21, 1950 |
| 2,516,099 | Board et al. | July 25, 1950 |
| 2,549,575 | Conley | Apr. 17, 1951 |